Dec. 23, 1958 K. STAIGER 2,865,593
PNEUMATICALLY OPERATED VALVE
Filed April 29, 1955 4 Sheets-Sheet 2
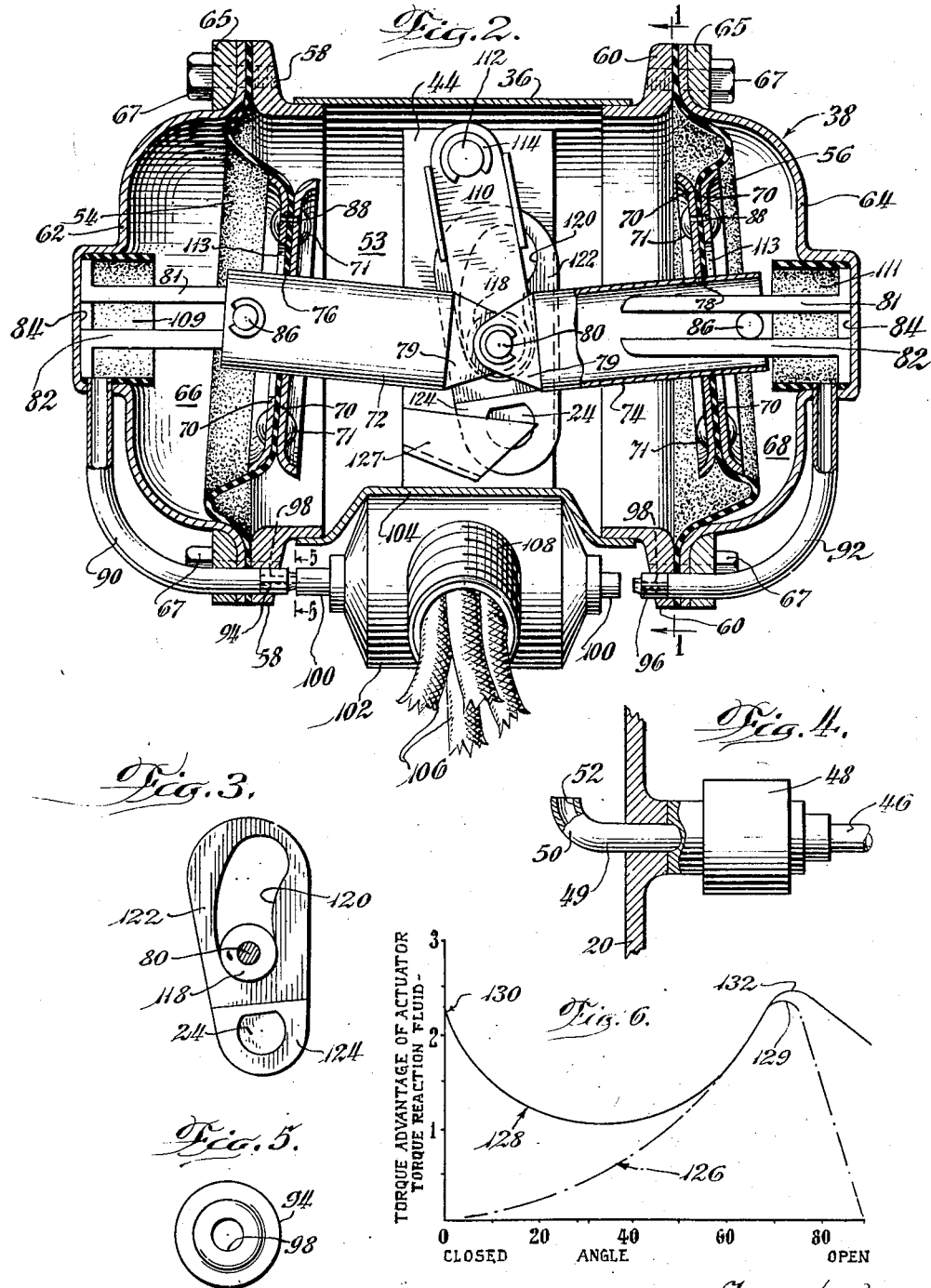

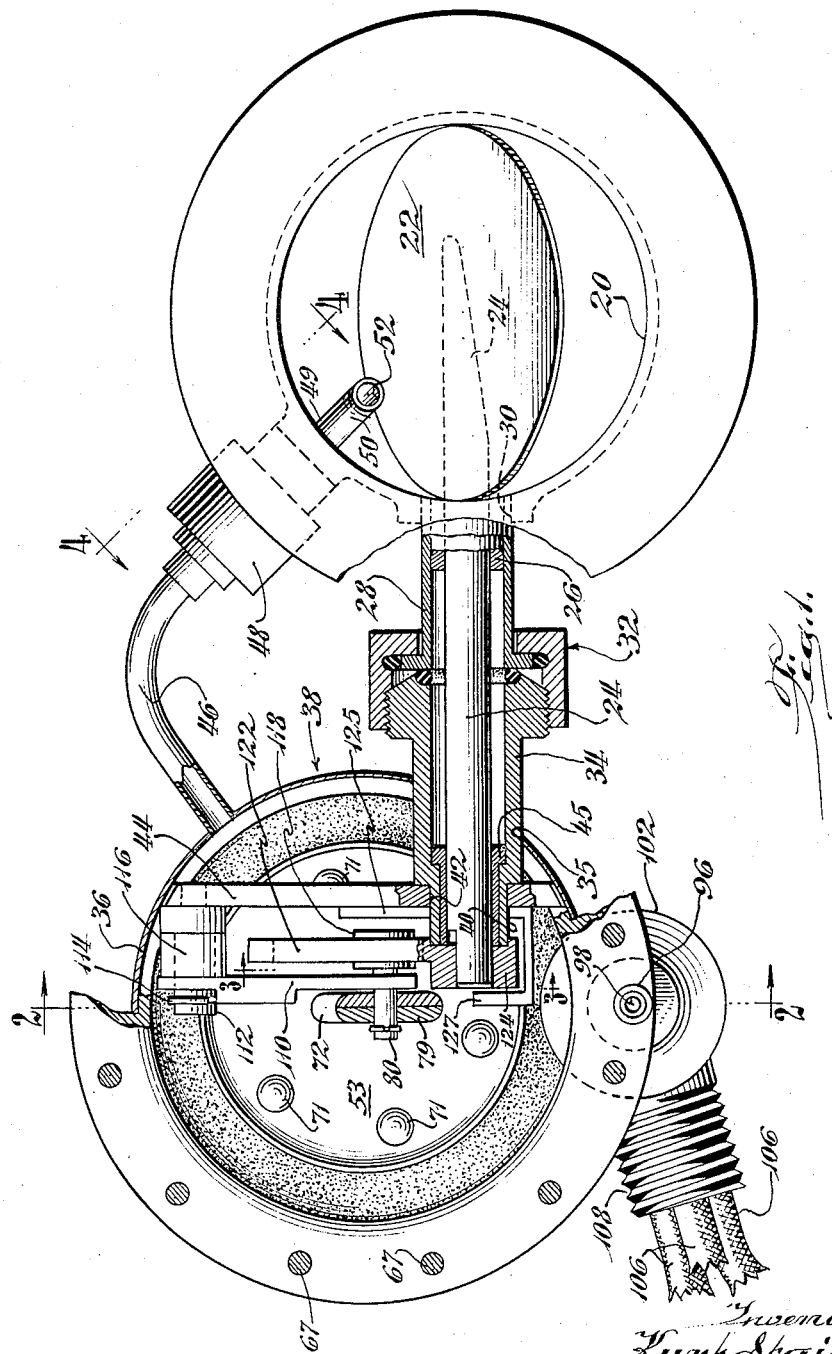

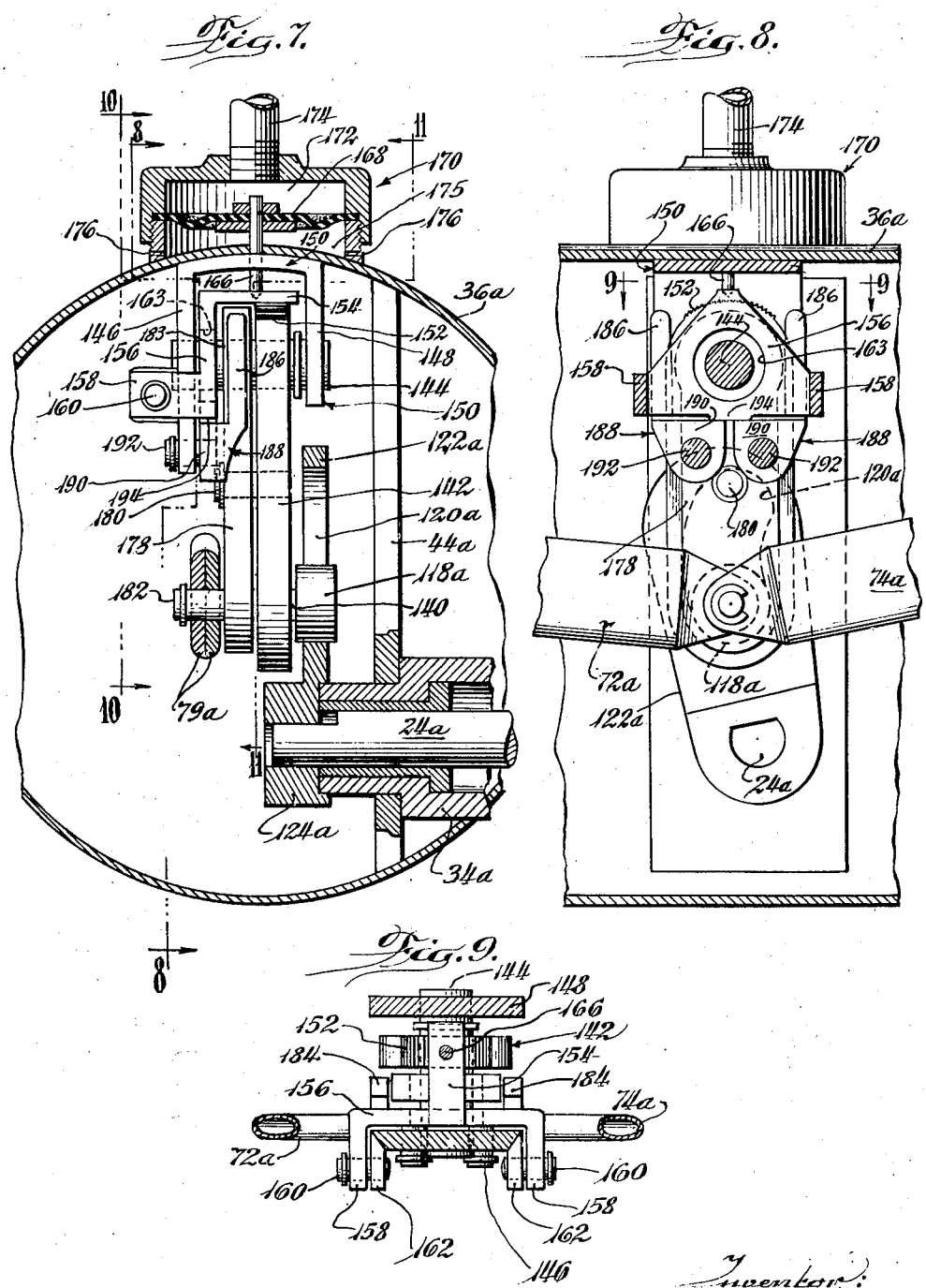

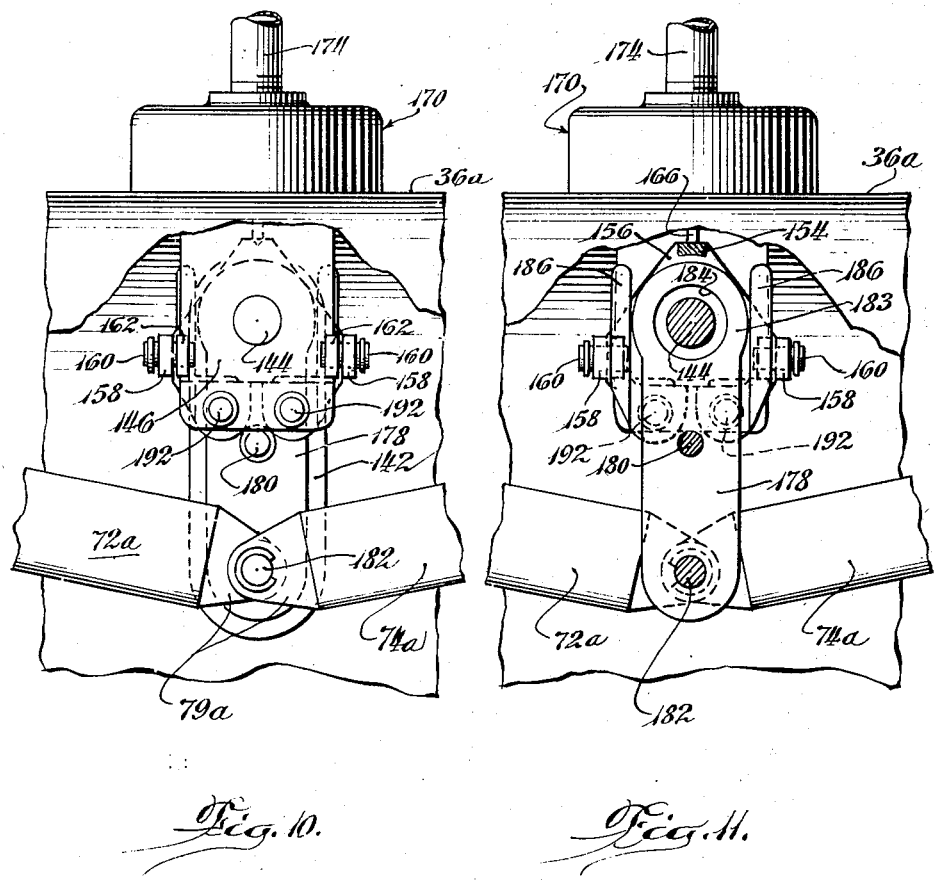

United States Patent Office 2,865,593
Patented Dec. 23, 1958

2,865,593

PNEUMATICALLY OPERATED VALVE

Kurt Staiger, Indianapolis, Ind., assignor to Stewart-Warner Corporation, Chicago, Ill., a corporation of Virginia Application April 29, 1955, Serial No. 504,752

12 Claims. (Cl. 251—30)

The present invention relates to power-operated valves of the butterfly type, and particularly to valves of this character which are used in aircraft to control the flow of air through high pressure, high temperature bleed ducts from jet propulsion engines.

One object is to provide, for controlling the airflow through a duct in an aircraft installation, for example, an extremely lightweight, compact control valve of very economical construction that operates in a highly dependable manner by pneumatic power produced by air under pressure supplied preferably from the duct controlled by the valve. A related object is to provide a dependable, pneumatically operated valve of this character that is well suited for remote control, as by means of a lightweight solenoid.

Another object is to provide a pneumatically operated valve of the character recited in the previous objects in which the primary, pneumatically actuated force applying components of the valve are connected to a movable flow control member by means of a linkage that assures unfailing operation of the valve and at the same time reduces the overall size of the actuating structure required by multiplying the mechanical advantage of the actuating structure when the fluid reaction on the flow control member is at its peak and again when the flow control member is moving either into or out of closed position.

A further object is to provide, for controlling the flow of high temperature air through a duct, a pneumatically operated valve incorporating improved actuating means which is energized by air supplied at a high temperature from the duct without being subjected to the high temperature of the air within the duct. A related object is to provide a valve of this character in which frictional drag on the actuating structure is minimized by the avoidance of any necessity for using tight seals around moving parts entering the duct in which the airflow is controlled by the valve.

An additional object is to provide a valve of the character recited in the previous objects which is readily adaptable to operate within a wide speed range at a predetermined speed that is substantially unaffected by pressure variations within the duct above a pressure level of approximately twice the ambient pressure.

Another object is to provide a pneumatically operated flow modulating valve in which a flow control member is held in any position of adjustment by self-engaging locking means of extremely efficient construction that is released upon the application of force by the pneumatic actuating means to adjust the flow control member.

Other objects and advantages will become apparent from the following description of the exemplary forms of the invention illustrated in the drawings, in which:

Figure 1 is a partially sectioned end view, taken generally along the line 1—1 with reference to Fig. 2, of a valve unit embodying the first illustrated form of the invention;

Fig. 2 is a vertical sectional view taken generally along the line 2—2 of Fig. 1;

Fig. 3 is a fragmentary sectional view of the valve actuating linkage taken along the line 3—3 of Fig. 2;

Fig. 4 is a fragmentary sectional view of the air intake for the pneumatic valve actuator taken along the line 4—4 of Fig. 1;

Fig. 5 is a detail view on an enlarged scale of a control orifice, taken along the line 5—5 of Fig. 2;

Fig. 6 is a graph illustrating the progressive changes in the mechanical advantage of the valve actuator and the fluid reaction on the airflow control member of the valve;

Fig. 7 is a vertical sectional view of the actuating linkage of a modified form of the invention;

Fig. 8 is a vertical sectional view taken along the line 8—8 of Fig. 7;

Fig. 9 is a fragmentary sectional view taken along the line 9—9 of Fig. 8;

Fig. 10 is a fragmentary sectional view taken along the line 10—10 of Fig. 7; and Fig. 11 is a fragmentary sectional view taken along the line 11—11 of Fig. 7.

The damper unit embodying the first illustrated form of the invention, Figs. 1 to 5, comprises a cylindrical duct segment 20, Fig. 1, flanged at opposite ends to connect with and form a part of a longer duct (not shown) used in an aircraft installation, for example, to bleed high pressure air for auxiliary use from a jet propulsion engine. The particular damper unit shown is designed to control air pressures ranging from fifteen to two hundred fifty pounds per square inch gauge in a duct segment 20 of approximately two and one-half inches in diameter. The temperature of air in the duct segment 20, may, under operating conditions in an aircraft installation, reach one thousand degrees Fahrenheit.

The flow of air through the duct segment 20 is controlled by a butterfly flow control member 22, Fig. 1, formed by a generally circular disc (denoted by the same reference numeral). The valve disc 22 is brazed or otherwise fixed centrally to a tapering end of an operating shaft 24 projecting into the duct segment 20 through a bearing 26 in the adjacent end of a generally cylindrical sleeve member 28 secured and sealed at one end by brazing or the like into an aperture 30 in the cylindrical side wall of the duct segment. The axes of the operating shaft 24 and the sleeve member 28 are generally perpendicular to and substantially coplanar with the axis of the duct segment 20.

The end of the sleeve member 28 projecting away from the duct segment 20 is separably connected and sealed by a coupling 32 to a second cylindrical sleeve member 34 forming a continuation of the sleeve member 28.

From the coupling 32, the sleeve member 34 projects through an opening 35 in the lower medial portion of a cylindrical member 36, Figs. 1 and 2, forming the central section of a larger actuator casing 38 having an overall cylindrical shape elongated perpendicularly to the shaft 24. The sleeve member 34 is brazed or otherwise sealed to the marginal edge of the opening 35 to form an airtight seal with the casing 38.

The end of the sleeve member 34 projecting into the casing section 36, Fig. 1, is necked down to a reduced diameter 40 and fitted through a circular opening 42 in the lower end of a vertical, generally rectangular support plate 44, perpendicular to the shaft 24. The upper and lower ends of the vertical support 44 are fixed by brazing or otherwise to the inner cylindrical surface of the casing section 36. As shown, the support 44 is spaced from the longitudinal center line of the actuator casing 38 toward the duct segment 20 by a distance of approximately one-half the radius of the casing section 36.

A bearing 45, Fig. 1, mounted in the end of the sleeve member 34 fitted into the support 44 supports the adjacent end of the shaft 24, which projects beyond the sleeve member 34 into the actuator casing 38. This projecting end of the shaft 24 connects with power actuating structure to be described presently.

Housed within the actuator casing 38, the power actuating structure is operated pneumatically by air under pressure supplied from the duct segment 20 in a manner which, as will presently appear, avoids subjecting the actuating structure to the high temperature of the air as supplied from the duct segment and at the same time obviates any necessity for using tight, friction producing seals around the operating shaft 24 extending from within the actuator casing into the duct segment 20.

Air for operating the valve is supplied from the duct segment 20 to the actuator casing 38 at a pressure, during operation of the valve, which is ordinarily somewhat greater than the static pressure within the duct segment. More specifically, air for operating the valve is supplied from the duct segment 20 at the "total pressure" of air on the upstream side of the flow control member 22. Roughly, this "total pressure" of the air picked up for operating the valve is equal to the static pressure in the duct segment on the upstream side of the valve member 22 increased by the pressure equivalent of the velocity of the air moving through the duct segment. With the possible exception of brief phases of its movements into and out of extreme closed position, the valve member 22 is at least partially open, permitting some flow of air through the duct segment 20, all the while it is being shifted from one position to another.

Structurally the means used for supplying operating air to the actuator casing 38 comprises, Fig. 1, a tubular conduit 46 connected at one end into the actuator casing section 36 and at the other end to a suitable coupling 48 by which a connection is made to a tubular pickup member 49, Fig. 4, projecting radially into the duct segment 20. As indicated in Fig. 1, the pickup tube 49 is located on the upstream side of the flow control member 22 in radially spaced relation to the axis of the operating shaft 24.

The inwardly projecting end of the tubular pickup member 49, Fig. 4, is bent into a 90 degree elbow 50 defining an inlet opening 52. The inlet opening 52 thus formed is substantially concentric with an axis parallel to the longitudinal axis of the duct segment 20, thus providing for optimum exposure to the dynamic pressure as well as the static pressure of air moving through the duct segment. The radial spacing of the opening 52 from the adjacent cylindrical surface of the casing segment 20 is sufficient to clear the more turbulent airflow along this surface.

The valve operating air under pressure supplied to the actuator casing 38 through the conduit 46 enters a plenum chamber 53, Figs. 1 and 2, in the central portion of the casing formed by the cylindrical casing section 36 and a pair of circular, flexible diaphragms 54, 56 secured, respectively, to two annular flanges 58, 60, welded or otherwise fixed and sealed to opposite ends of the casing section 36.

The peripheries of the diaphragms 54, 56 are clamped between the respective flanges 58, 60 and the marginal edges of two outwardly dished end caps 62, 64 fastened to the flanges by two clamping rings 65 and cap screws 67 threaded into the flanges. The space between the diaphragms 54, 56 and the respective end caps 62, 64 forms two exhaust chambers 66, 68 in opposite ends of the actuator casing 38.

Formed from a stretch resistant rubber, elastomer or the like capable of standing up under temperatures of 350 degrees Fahrenheit or higher, each diaphragm 54, 56 is centrally reinforced by a pair of metal discs 70 held tightly against opposite sides of the diaphragm by rivets 71 extending through both discs.

The two diaphragms 54, 56 are centrally connected together to move in unison in opposite directions along the longitudinal axis of the actuator casing 38. For this purpose, two flattened tubular connecting links 72, 74 are fitted into vertically elongated central openings 76, 78 in the respective diaphragms 54, 60 and the associated reinforcing discs 70. Each tubular connector 72, 74 is brazed, welded or otherwise suitably secured to the adjacent diaphragm support disc 70 facing the plenum chamber 53. Adjacent ends of the two connectors are connected together by triangular blocks 79 secured to the respective connectors and pivoted together by a transverse connecting pin 80.

The end of each tubular connector 72, 74 opposite the connecting pin 80 projects a short distance through the attached diaphragm into the adjacent exhaust chamber.

Reverse movements of the end of each tubular connector 72, 74 projecting outwardly beyond the associated diaphragm is confined substantially to a straight line by means of a pair of parallel guide members 81, 82 anchored in the base of a well 84 swaged outwardly in the central portion of the adjacent casing cap and extending into the tubular connector in straddling relation to a transverse pin 86 fixed in the outwardly projecting end of the connector.

Controlled bleeding of air under pressure from the plenum chamber 53 into the respective exhaust chambers 66, 68 is provided for by the formation in each diaphragm 54, 56 and the attached reenforcing discs 70 of a bleed orifice 88 of limited predetermined flow area.

Exhaust passages from the two exhaust chambers 66, 68 are provided by two tubular conduits 90, 92 respectively connected at one end into and protruding through the cylindrical side walls of the wells 84 swaged in the respective casing end caps 62, 64.

From upper ends communicating with the exhaust chambers 66, 68 the tubes 90, 92, Fig. 2, extend downwardly and inwardly through the lower marginal edges of the adjacent clamping rings 65, end caps 62, 64, and diaphragms 54, 56, to connect with centrally bored plugs 94, 96 fixed in the respective flanges 58, 60 in opposing relation to each other. Each plug 94, 96, Figs. 2 and 5, defines a central exhaust orifice 98 connected with the adjacent exhaust tube and opening toward a similar orifice in the other plug.

The opposed exhaust orifices 98 in the respective plugs 94, 96 are open and closed alternately by opposite ends of a plunger 100, Fig. 2, projecting outwardly from the respective ends of a double acting solenoid assembly 102 fixed to an upwardly displaced underside portion 104 of the central casing section 36. The solenoid assembly 102 itself is of a conventional economical construction requiring no specific description here. Control wires 106 projecting from a coupling connection 108 on one side of the solenoid assembly 102 provide for convenient operation of the assembly and hence (as will presently appear) the entire valve unit from a remote control station.

Connected together by the tubular members 72, 74, the diaphragms 54, 56 form primary pneumatic actuating means movable in opposite directions along the longitudinal axis of the casing 38 upon operation by remote control or otherwise of simple control means, formed in this instance by the solenoid assembly 102.

To produce pneumatically powered movement of the diaphragms 54, 56 and to the right, Fig. 2, the solenoid assembly 102 is energized to shift the plunger 100 to the left, blocking the orifice 98 in the plug 94 thus closing the exhaust tube 90 from the left hand exhaust chamber 66. The result is a build-up in pressure in the exhaust chamber 66 due to high pressure air bleeding through the orifice 88 in diaphragm 54 from the plenum chamber 53. The length of the plunger 100 is somewhat shorter than the spacing between the adjacent ends of the control plugs 94, 96 defining the two orifices 98. Hence, movement of the plunger 100 to the left, Fig. 2, opens the orifice 98 in the plug 96 to allow exhausting of air from the exhaust chamber 68. The escape of air from the chamber 68 lowers the pressure in this chamber to an intermediate value between the pressure within the plenum chamber 53 and the ambient pressure.

The degree to which the pressure within the exhaust chamber 68 drops upon uncovering the orifice 98 in the plug 96 is limited, first, by the replacement of air escaping from the exhaust chamber by air from the plenum chamber 53 bleeding through the orifice 88 in the diaphragm 56 and, second, by the size of the orifice 98, which is limited with respect to the size of the orifice 88. In general, the "back pressure" level within the exhaust chamber 68 can be increased or decreased in relation to the pressure within the plenum chamber 53 by decreasing or increasing respectively the size of the orifice 98 in the plug 96 in relation to the size of the orifice 88 in the diaphragm 56.

The actual back pressure existing in the exhaust chamber connected to atmosphere will be influenced under operating conditions by the other factors including the speed and resistance to movement of the diaphragms 54, 56 in the actuator casing 38. In one very satisfactory design of a valve unit embodying the invention the size of the exhaust orifices 98 in relation to that of the bleed orifices 88 is such that the back pressure in the exhaust chamber opened to the atmosphere does not under normal operating conditions (when the diaphragms 54, 56 are free to move within the casing 38) drop below 80 or 90 percent of the pressure within the plenum chamber 53. Even with the diaphragms held against movement the back pressure in the exhaust chamber opened to the atmosphere does not drop below 60 percent of the plenum chamber pressure.

This effective limitation of the maximum differential pressure across either of the diaphragms 54, 56 to a value of approximately 40 percent of the total pressure in the plenum chamber 53 is of special advantage in reducing the stress on actuating diaphragms in units in which the operating air as supplied to the plenum chamber is under particularly high pressure. Thus the strength of the diaphragms necessary for durability and dependability in operation is minimized with substantial savings in cost and weight.

Shifting of the control plunger 100 to the left, Fig. 2, in the manner described produces a differential pressure in the exhaust chambers 66, 68 tending to force the two connected diaphragms 54, 56 to the right, i. e., toward the exhaust chamber 68 opened to the atmosphere. The pressure of air within the plenum chamber 53 on the two diaphragms 54, 56 is balanced out by the connection of the diaphragms to each other.

Operation of the solenoid assembly 102 to shift the plunger 100 to the right, Fig. 2, to close the orifice 98 in the plug 96 and open the orifice 98 in the plug 94 will result in pneumatic powered movement of the diaphragms 54, 56 to the left in a manner just the reverse of the above described movement of the diaphragms to the right.

The maximum speed of movement of the connected diaphragms 54, 56 longitudinally in the actuator casing 38 is determined by (1) the rate at which air can flow into the closed exhaust chamber 66 or 68, and (2) the rate air can escape through the uncovered exhaust orifice 98. In general, the maximum speed of operation of the diaphragms 54, 56 is increased by increasing the size of the bleed orifices 88 and the exhaust orifices 98. The size of the orifices 88 and 98 relative to each other is determined in the manner just discussed to provide the desired back pressure in the exhaust chamber opened to the atmosphere.

In operation the speed of movement of the connected diaphragms 54, 56 is slowed by the resistance of attached valve actuating structure to be presently described. Specifically the speed reduction is due to the greater time required to build up the increased differential pressure in the actuator necessary to overcome the resistance and diaphragm movement. This factor of load, of course, is taken into account in sizing the orifices to provide the operating speed desired.

By varying the size of the orifices 88 and 98, the time required for the diaphragms 54, 56 to complete one stroke of movement longitudinally in the casing 38 can be varied between 2 and 10 seconds, for example. For operational pressures in the plenum chamber 53 in excess of approximately twice the ambient pressure, the operating speed of the diaphragms 54, 56 is substantially unaffected by pressure variations in the plenum chamber.

Even though operated by air supplied directly from the duct segment 20, the diaphragms 54, 56 are not subjected to the high temperatures which the operating air may have as it enters the pickup orifice 52. The rate of flow of operating air through the conduit 46 into the plenum chamber 53 is limited to the flow through the orifices 88 into the exhaust chambers 66, 68 upon opening of one of the exhaust orifices 98. This rate is restricted by the size of the orifices 88 and 98 to the extent that the air has time to cool appreciably in flowing through the conduit 46 to the plenum chamber. Moreover, the air supplied to the plenum chamber 53 through the conduit 46 is commingled with air already in this chamber. Between operating cycles the air in the plenum chamber 53 has an opportunity to cool by conduction through the casing 38. For an air temperature of about 1000 degrees Fahrenheit in the duct segment 20, the diaphragms 54, 56 of the valve unit thus provided would be exposed to a temperature of the order of 350 degrees.

The escape of air from the exhaust orifice 98 open to the atmosphere continues only until movement of the connected diaphragms 54, 56 to one extreme position in the casing 38 has been completed. To terminate the escape of air from the exhaust chamber connected to the atmosphere after completion of such movement of the diaphragms, a pair of short tubes or cylinders 109, 111 are fitted into the wells 84 in the respective casing caps 62, 64 to extend inwardly a substantial distance into the respective exhaust chambers 66, 67. The inner ends of the cylinders 109, 111 form valve seats which cooperate with the central portions of the respective diaphragms 54, 56 immediately surrounding the tubular connectors 72, 74. This portion of each diaphragm is exposed for engagement with the adjacent tubular member by a large central opening 113, Fig. 2, in the reinforcing disc 70 adjacent the tubular member.

In operation, the two connected diaphragms 54, 56 move to the right, for example, to one extreme position in which the portion of the diaphragm 56 immediately encircling the connector 74 is pressed hard against the valve seat formed by the inner end of the tubular segment 112. The result is to close off the flow of air through the valve passage defined by the tubular member 112 into the exhaust tube 92, which extends through the outer end of the tubular member from the adjacent side wall of the well 84.

Operation of the valve control shaft by means of the interconnected diaphragms 54, 56 is effected through an interconnecting linkage which multiplies the mechanical advantage to the pneumatic actuating structure when the fluid reaction on the flow control member 22 is at its peak and again when this member is moving either into or out of its fully closed position, thus assuring unfailing operation of the valve while at the same time permitting minimization of the overall size and weight of pneumatic actuating structure. Except for those phases of movement of the flow control member 22 during which the mechanical advantage of the pneumatic actuating structure is multiplied, the speed of the flow control member is increased relative to that of the actuating diaphragms 54, 56, thus minimizing the overall movement of the diaphragms required for opening and closing the valve.

The interconnecting linkage which produces the action recited is simple in construction. As shown in Figs. 1 and 2, the linkage comprises a generally vertical guide link 110 pivotally supported at its upper end on a transverse pin 112 fixed to the upper end of the previously mentioned support plate 44. The link 110 is held on the pin 112 by a snap ring 114 and spaced from the support plate 44 by a bushing 116 which locates the link near a central longitudinal plane of the actuator casing 38.

The lever end of the link 110 is apertured to receive and form a swingable support for the medial portion of the interconnecting pin 80 between the diaphragm connector members 79.

The effective length of the guide arm 110, between the support pin 112 and the connecting pin 80, is substantially shorter than the distance between the axis of the pin 112 and the extended axis of the valve operating shaft 24; as shown, the length of the arm is approximately two-thirds of the distance recited. Hence, upon movement of the diaphragms 54, 56 longitudinally within the actuator casing 38, the arm 110 guides the pin 80 in an arc overlying the shaft 24, Figs. 1 and 2, and extending to opposite sides of the axis of this shaft.

The end of the pin 80 opposite the connector members 79 projects through the guide arm 110 and forms a journal for a roller 118, Figs. 1 and 3, constituting one transmission element of the actuating linkage. The roller 118 fits into a kidney-shaped slot or guide 120, Figs. 2 and 3, formed in a radial arm 122 extending upwardly from an integral hub 124 fixed nonrotatably to the end of the control shaft 24 projecting inwardly from the sleeve 34, Figs. 1 and 3. From an inner end radially spaced a short distance from the adjacent end of the sleeve 34, the slot 120 extends radially outward from the axis of the shaft 24 with a slight circumferential curve toward its upper outer end, turned in the clockwise direction with reference to Figs. 2 and 3.

In conjunction with this curvature of the slot 120, it should be pointed out that the support pin 112 for the guide link 110 is located somewhat to the left, Fig. 2, of a vertical plane through the axis of the control shaft 24. As will presently appear, this displacement of the pin 112 relative to the shaft 24 operates in conjunction with the curved shaping of the slot 120 which receives the roller 118 to provide an optimum multiplication of the mechanical advantage of the pneumatic actuating structure in relation to the fluid reaction on the flow control member.

A generally U-shaped bracket 125 fixed to the support plate 44 has one leg 127 extending transversely across the adjacent end of the shaft 24 and the hub 124.

The duct segment 20 is closed by clockwise rotation (with reference to Fig. 2) of the flow control member 22, Fig. 1, by the control shaft 24 and the connected arm 122. Since the interconnecting roller 118 is located above the shaft 24, this valve closing movement of the shaft is produced by displacement of the diaphragms 54, 56 to the right, Fig. 2. It follows that movement of the diaphragms to the left opens the flow valve.

Before discussing further the leverage multiplying characteristics the linkage used between the diaphragms 54, 56 and the control shaft 24, it will be helpful to refer briefly to Fig. 6, which depicts graphically the reaction of fluid in the duct segment 20 as a torque on the flow control member 22 for the various angular positions of the flow control member in the duct segment. This torque reaction is indicated by the broken line 126 on the graph in Fig. 6 in which the torque reaction is plotted as the ordinate against the angle at which the flow control member is displaced from its fully closed position as the abscissa.

This torque reaction of the fluid on the flow control member 22 is characteristic of butterfly valves. As indicated by the graph line 126, the torque reaction on the flow control member is substantially zero when the flow control member is either fully open or fully closed. Upon movement of the flow control member away from its fully closed position the reaction of the fluid as a torque on the member increases at a steadily increasing rate to a peak value 129 reached when the flow control member is displaced between 65 and 75 degrees approximately from its fully closed position. Then the torque reaction drops off sharply as the flow control member is moved on to its fully open position at which the torque reaction again becomes substantially zero.

The mechanical advantage afforded the pneumatic actuator in moving the flow control member 22 is plotted as an ordinate value in Fig. 6 against the angular position of the flow control member as an abscissa value to produce the solid graph line 128. As depicted by this line, the torque advantage of the actuator is multiplied to a first peak value 130 when the flow control member is in the immediate vicinity of its fully closed position. The mechanical advantage of the actuator is multiplied to a second peak value 132 which substantially coincides, with respect to the angular position of the flow control member, with the torque reaction on the flow control member of fluid in the duct segment 20. This second peak 132 in the mechanical advantage to the pneumatic actuator is somewhat greater than the peak 130 provided when the flow control member is being moved into and out of closed position. Between these two peak values 130 and 132, the mechanical advantage of the pneumatic actuating structure is reduced and the degree of movement of the flow control member 22 for each increment of actuator movement is increased.

These operating characteristics of the valve actuating linkage, which presently will be more specifically related to the structure of the linkage described, provide great certainty and efficiency in operation of the valve by pneumatic actuating structure while at the same time minimizing the overall size and weight of the pneumatic actuating structure required.

Without attempting an exhaustive analysis of the kinematics of the valve actuating linkage previously described, it will be observed with reference to Fig. 2 that the guide arm 110 carries the pin 80 and roller 118 closest to the axis of the operating shaft 24 when the actuating linkage is near the midportion of its stroke between opposite extreme positions. During this phase of actuator movement, the radius arm of the connecting pin 80 about the axis of the shaft 24 is at a minimum, thus producing the maximum angular displacement of the shaft 24 for each increment of movement of the diaphragms 54, 56 longitudinally within the casing 38. As the pin 80 is moved to either side of a plane extending through the axes of the shaft 24 and the pin 112, the radius arm of the pin 80 about the shaft 24 is increased. This increases the effective mechanical advantage of the diaphragms 54, 56 in applying torque to the shaft 24.

As the diaphragms 54, 56 move farther to the right, Fig. 2, from a position in which the pin 80 is centered with a plane running through the axes of the shaft 24 and the pin 112, the mechanical advantage of the actuating structure steadily increases from its minimum value to the peak 130, Fig. 6, reached when the flow control member is fully closed.

Movement of the diaphragms 54, 56 to the left, Fig. 2, of the position in which the mechanical advantage of the actuating linkage is a minimum produces a steadily increasing mechanical advantage up to the peak 132 (see Fig. 6) reached when the flow control member 22 is approximately fifteen degrees short of its fully open position.

As previously stated, the peak 132 in the mechanical advantage to the actuator is somewhat greater than the peak 130. This difference in the operating characteristics of the actuating linkage in moving toward the open position of the flow control member in contrast to its operation in moving toward the closed position of the flow control member is produced by the previously described crescent-shaped curvature of the slot 120 which receives the roller 118 and also by the displacement of the support pin 112 to the left, Fig. 2, of the axis of the shaft 24.

In regard further to the efficiency of the pneumatically actuated valve unit thus provided, it will be remembered that during movement of the flow control member 22 operating air is supplied to the plenum chamber 53 under a "total" pressure, somewhat higher than the static pressure in the duct segment 20. Hence, there is no tendency for air to flow along the operating shaft 24 from the duct segment 20 to the actuator casing 38. This obviates any need for using air seals around the shaft such as might impose a frictional drag on its rotary movement in the bearings 26 and 45.

The pneumatically powered valve unit embodying the invention is extremely efficient and dependable in operation. The extreme light weight of the unit is pointed up by an engineering estimate that pneumatic actuating structure constructed in accordance with the invention for working a butterfly flow control member in ducts up to 2.5 inches in diameter and containing internal pressures up to 250 pounds per square inch gauge will weigh only one pound.

Automatic locking of the flow control member of the valve unit in any intermediate position of adjustment without interfering with the normal operation of the pneumatic actuating structure to change the position of the flow control member is provided for in a modified form of the interconnecting actuating linkage shown in Figs. 7 to 11. To simplify the description structural components of the modified linkage assembly, which form counterparts of structural elements of the first form of the actuating linkage just described, are denoted with the same reference numerals with the addition of the subscript *a*.

The principal distinction between the modified form of the actuating linkage and that previously described is the replacement in the modified form of the single guide link 110 of the first form by an assembly of rather simple elements which operate to hold the operating shaft 24a and arm 122a against rotary movement except when force is applied by the connector links 72a, and 74a to change the position of the flow control member.

In the modified actuating linkage, Figs. 7 and 8, the roller 118a is journaled on a stub shaft 140 fixed in and projecting laterally from the lower end of a generally vertical guide link 142. The upper end of the guide link 142 is pivotally supported on a transverse pin 144 parallel to the operating shaft 24a. Opposite ends of the pin 144 are supported in two depending legs 146, 148 of a U-shaped bracket 150, Fig. 7, welded or otherwise secured to the inner surface of the casing section 36a overlying the inwardly protruding end of the shaft 24a.

The upper end of the link 142 continues somewhat above the pin 144 to an arcuate extremity defining a series of circumferentially spaced serrations 152 parallel to the pin 144.

Normally the guide arm 142 is held against swinging movement by engagement with the serrations 152 of a pawl extension 154 projecting horizontally from the upper end of a generally vertical locking flap 156 disposed generally along the inner face of the depending bracket leg 146. The locking flap 156 is supported for pivotal movement about a horizontal axis by two arms 158 integral with the opposite lower edges of the locking flap and extending horizontally therefrom in straddling relation to the bracket leg 146. The arms 158 pivot on two horizontal pins 160 supported in a pair of horizontal ears 162 integral with and turned laterally from the opposite vertical edges of the bracket leg 146. See Figs. 7 to 10.

Clearance for vertical swinging movement of the flap 156 with respect to the pin 144 is provided by an enlarged hole 163 in the flap which receives the pin.

The pawl projection 154 is biased downwardly toward the serrations 152 in the link 142 by a pressure applying pin 166 extending downwardly through the casing section 36a from a flexible diaphragm 168 mounted in a pressure applying fixture 170 on the upper side of the casing section. As shown in Fig. 7, the fixture 170 includes means defining a pressure chamber 172 above the diaphragm 168 which is connected by a conduit 174 to a suitable source of high pressure air, such as the duct segment 20 referred to in the description of the first form of the invention. A space 175 between the diaphragm 168 and the casing section 36a is suitably vented to the atmosphere as by means of small outlet orifices 176.

With pressure constantly applied through the line 174 to the space 172, the pawl member 154 is normally held in engagement with the guide link serrations 152 to lock the control shaft 24a against rotary displacement.

Release of the locking flap 156 to allow free swinging movement of the link 142 is effected automatically as an incident to the application of force through the connectors 72a and 74a to adjust the position of the control shaft 24a. The means which accomplishes this unlocking action comprises a connecting link 178 centrally pivoted by a pin 180 to the central portion of the guide link 142, Figs. 7 and 8. The lower end of the link 178 is pivoted to the two connectors 72a and 74a by means of a pin 182 in substantial alignment with the roller support stub shaft 140.

The upper end of the connecting link 178 forms an enlarged head 183, Fig. 11, defining an opening 184 receiving the pin 144. The opening 184 is somewhat larger than the pin 144 thus providing for limited swinging movement of the connecting link 178 on the support pin 180 in relation to the guide link 142.

Opposite sides of the connecting link head 183 are embraced by two generally vertical ear portions 186, Figs. 7 to 11, of two dog members 188 pivotally supported on the lower end of the bracket leg 146, which extends below the locking flap 156. As shown in Figs. 7 and 8, the ear 186 of each dog 188 is integrally connected at its lower end with a base portion 190 of the dog, that is offset toward the bracket leg 146 and swingably mounted on a dog support pin 192 extending laterally from the bracket leg. Two support pins 192 horizontally spaced from each other are provided for the respective dogs 188.

The upper edges of the bases 190 of the two dogs 188 immediately underlie the lower edge of the lock flap 156. A downwardly extending projection 194 on the lower central edge of the locking flap 156 engages the adjacent portions of the upper edges of both dog bases 190, which have a spacing from each other substantially less than that between the axes of the dog support pins 192.

In operation, actuating force applied to the lower end of the connecting link 178 by the connectors 72a and 74a initially swings the link about the medial support pin 180 until the marginal edge of the link defining the hole 184, Fig. 11, engages the pin 144. This swinging movement of the link 178 in either direction with respect to the guide link 142, Fig. 10, works the head 183 of the link against one of the dog ears 186. This swings the base 190 of the dog thus actuated upwardly against the flap projection 194 to raise the flap 156, disengaging the pawl 154 from the serrations 152 in the arm 142.

This action, produced as an incident to the application of actuating force by the connectors 72a, 74a, automatically releases the guide link 142 for swinging movement. Since further pivotal movement of the connecting link 178 relative to the guide link 142 is prevented by the previously mentioned engagement of the upper end of the guide link 178 with the pin 144, continued movement of the connectors 72a, 74a swings the guide link 142 to rotate the operating shaft 24a through the roller 118a and arm 122a.

With the relaxation of actuating force by the connectors 72a, 74a the pressure biased pin 166 forces the locking pawl 154 back down into engagement with the guide link serrations 152 to automatically lock the guide link 142 and hence the operating shaft 24a against further angular displacement until effective actuating force is again applied through the connectors 72a, 74a.

It is evident that the mechanism thus provided normally holds the valve actuating shaft 24a against angular displacement, releasing the shaft only during the application of force through the connectors 72a, 74a to adjust the position of the shaft and hence the attached flow control structure.

The result is to provide a highly effective pneumatic adjustment of the valve structure between various positions between its extreme open and closed positions, while at the same time automatically assuring retention of the valve structure to any position to which it is moved.

While I have shown and described preferred embodiments of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. A pneumatically actuated valve comprising, in combination, a duct member, casing means adjacent said duct member, a movable valve member mounted in said duct member for changing the effective flow area therethrough, an operating shaft connected to said valve member and extending into said casing, a pair of flexible diaphragms mounted in said casing means and defining therewith a plenum chamber, an air inlet in said duct member on the upstream side of said valve member, means connecting said air inlet with said plenum chamber, said casing means including means defining with said respective diaphragms exhaust chambers on the sides of the diaphragms opposite said plenum chamber, means providing continuously for limited communication of said respective exhaust chambers with said air inlet in said duct, a pair of valve seats communicating with said respective exhaust chambers, means defining a pair of exhaust passageways communicating with said respective exhaust chambers through said respective valve seats, said diaphragms including valve closure means for engagement with said respective valve seats as an incident to predetermined displacement of said diaphragms in opposite directions within said casing to block the outflow of air through said respective exhaust passageways, the effective flow areas of said exhaust passageways being limited with respect to the flow areas of said means establishing communication between the respective exhaust chambers and said air inlet to limit the maximum relative pressure drop in said exhaust chambers with respect to the pressure in said duct member, means for opening and closing said exhaust passageways alternately, and linkage means connecting said diaphragms to said shaft to transmit reverse movements of said diaphragms to said shaft as rotary movement effective for shifting said valve member in said duct member.

2. A pneumatically actuated valve comprising, in combination, a duct member, an actuator casing adjacent said duct member, a movable valve member in said duct member for opening and closing the latter, operating shaft means connected to said valve member and extending into said casing, an arm connected to the end of said shaft means in said casing and extending radially from the axis of the shaft, said arm forming a guide thereon extending radially outward from the axis of said shaft means, a swingable guide lever, means pivotally supporting said guide lever in said casing at a location on the lever radially spaced from said shaft axis, a transmission element articulated with said guide for movement therealong and connected to said guide lever for movement therewith in an arc extending between said pivotal lever support and said shaft axis, flexible diaphragm means mounted in said casing, means connecting said diaphragm means to said lever to transmit diaphragm motion to the latter, said casing including means defining with said diaphragm means exhaust chambers on opposite sides of the latter, air inlet means in said duct member on the upstream side of said valve member, means providing continuously for limited communication between said air inlet means and said respective exhaust chambers, means defining a pair of valve passages communicating with said respective exhaust chambers, means defining two exhaust openings communicating with said respective exhaust chambers through said respective valve passages, said diaphragm means including means associated therewith and cooperable with said valve passages to close either passage as an incident to displacement of said diaphragm means effecting a predetermined contraction of the exhaust chamber communicating with the passage, and means for opening and closing said exhaust openings alternately.

3. A pneumatically actuated valve unit comprising, in combination, a duct member, a pneumatic actuator casing adjacent said duct member, sleeve means connected at opposite ends into said duct member and said casing, a movable butterfly valve member disposed within said duct member for opening and closing the latter, an operating shaft connected to said valve member and extending through said sleeve into said casing, an arm connected to the end of said shaft extending into said casing and projecting radially from the shaft, said arm forming an elongated guide thereon extending radially outward from said shaft, a swingable guide lever, means providing pivotal support to said lever at a location thereon radially spaced from the axis of said shaft, a transmission element on said lever articulating with said guide on said arm to transmit to the latter movement of said lever, the distance between said transmission element and the pivotal support to said guide lever being somewhat less than the spacing between the pivotal support to said guide lever and the axis of said shaft, a pair of movable diaphragms mounted in said casing on opposite sides of said guide lever and coacting with the casing to form a plenum chamber between the diaphragms, an operating air intake in said duct member on the upstream side of said valve member, said air intake defining an air intake opening oriented to receive the kinetic impact of air flowing in the duct member to pass by said valve member, conduit means connecting said air intake with said plenum chamber, a pair of connecting links connecting said respective diaphragms with said guide lever, said casing including means coacting with said respective diaphragms to define therewith exhaust chambers on the sides thereof opposite from said plenum chamber, said casing including means defining valve passages communicating with said respective exhaust chambers, means forming exhaust openings communicating with said respective exhaust chambers through said respective valve passages, said diaphragms including in association therewith means cooperable with said respective valve passages to close either valve passage as an incident to displacement of said diaphragms in said casing to effect a predetermined contraction of the exhaust chamber communicating with the valve passage, control means for opening and closing said exhaust openings alternately, and means providing continuously for bleeding air under pressure from said plenum chamber into said respective exhaust chambers, the effective flow area of said means for bleeding air into each exhaust chamber being substantially smaller than said exhaust opening communicating with the exhaust chamber.

4. A pneumatically actuated valve unit comprising, in combination, a duct member, a pneumatic actuator casing adjacent said duct member, a movable butterfly valve member disposed within said duct member for opening and closing the latter, rotary shaft means connected to said valve member and extending into said casing, an arm connected to said shaft means in said casing and extending radially from the axis of the shaft means, said arm forming a guide thereon extending radially outward from said shaft means, a swingable guide lever, means providing pivotal support to said lever at a location thereon radially spaced from the axis of said shaft, a transmission element on said lever articulating with said guide on said arm to transmit to the latter movement of said lever, the distance between said transmission element and the pivotal support to said guide lever being somewhat less than the spacing between the pivotal support to said guide lever and the axis of said shaft means, movable pneumatic actuating means in said casing, linkage means connecting said pneumatic actuating means with said guide lever, said casing including means defining exhaust chambers on opposite sides of said pneumatic actuating means, air inlet means in said duct member on the upstream side of said valve member, means providing continuously for limited communication between said air inlet means and said respective exhaust chambers, means defining a pair of valve passages communicating with said respective exhaust chambers, means defining two exhaust openings communicating with said respective exhaust chambers through said respective valve passages, said actuating means including means associated therewith and cooperable with said valve passages to close either passage as an incident to displacement of said actuating means effecting a predetermined contraction of the exhaust chamber communicating with the passage, and means for opening and closing said exhaust openings alternately.

5. A pneumatically actuated valve comprising, in combination, a duct member, casing means adjacent said duct member, a movable valve member mounted in said duct member for changing the effective flow area therethrough, an operating shaft connected to said valve member and extending into said casing means, a pair of movable diaphragms mounted in said casing means and defining therewith a plenum chamber, an air inlet in said duct member on the upstream side of said valve member, conduit means connected at opposite ends to said air inlet and said plenum chamber, respectively, said conduit between opposite ends thereof being located externally of said duct member and said casing means for cooling by the surrounding atmosphere, said casing means including means defining with said respective diaphragms exhaust chambers on the sides of the diaphragms opposite said plenum chamber, said respective diaphragms defining small orifices extending therethrough providing continuously for limited communication between said plenum chamber and said respective exhaust chambers, a pair of valve passages communicating with said respective exhaust chambers, means defining a pair of exhaust passageways communicating with said respective exhaust chambers through said respective valve passages, said diaphragms including valve closure means for closing said respective valve passages as an incident to predetermined displacement of said diaphragms in opposite directions within said casing, means limiting the overall effective flow areas of said exhaust passageways with respect to the flow areas of said orifices in said diaphragms to limit the escape of air through the passageways and to limit the maximum relative pressure drop in said exhaust chambers with respect to the pressure in said plenum chamber, means for opening and closing said exhaust passageways alternately, and linkage means connecting said diaphragms to said shaft to transmit reverse movements of said diaphragms to said shaft as rotary movements effective for shifting said valve member in said duct member.

6. A pneumatically actuated valve unit comprising, in combination, a duct member, casing means adjacent said duct member, a movable valve member disposed in said duct member for changing the effective flow area therethrough, an operating shaft connected to said valve member and extending into said casing means, reciprocable pneumatic actuating means mounted in said casing means, said casing means including means defining with said actuating means exhaust chambers on opposite sides of said actuating means, air inlet means in said duct member on the upstream side of said valve member, means providing continuously for limited communication between said air inlet means and said respective exhaust chambers, means defining a pair of valve passages communicating with said respective exhaust chambers, means defining two exhaust openings communicating with said respective exhaust chambers through said respective valve passages, said pneumatic actuating means including means associated therewith and cooperable with said valve passages to close either passage as an incident to displacement of said actuator means effecting a predetermined contraction of the exhaust chamber communicating with the passage, means for opening and closing said openings alternately, an arm connected to said shaft in said casing means and extending radially from the axis of the shaft, said arm forming a guide thereon extending radially outward from the axis of said shaft, said guide being curved circumferentially toward the outer end thereof in the direction of angular movement thereof corresponding to rotary movement of said valve member to close said duct member, a swingable guide lever, means providing pivotal support to said lever at a location thereon radially spaced from the axis of said shaft, a transmission element articulated with said guide for movement therealong and connected to said guide lever for movement therewith in an arc extending between said pivotal lever support and the axis of said shaft, and means connecting said pneumatic actuating means with said guide lever, the unit thus formed providing for pneumatic powered movement of said valve member between fully open and fully closed positions within said duct member, said pivotal support to said guide link being displaced to one side of a plane through the axis of the shaft bisecting the arc of movement of said arm as an incident to movement of said valve member between fully open and closed positions, the side of said plane corresponding to the direction of movement therefrom of said arm in moving said valve member to fully open position.

7. A pneumatically actuated valve unit comprising, in combination, a duct member, a pneumatic actuator casing adjacent said duct member, sleeve means having sealed connections at opposite ends to said duct member and said casing, a movable butterfly valve member disposed within said duct member for opening and closing the latter, an operating shaft connected to said valve member and extending through said sleeve into said casing, said shaft and said sleeve means having sufficient looseness relative to each other to allow a flow of air along the shaft, a pair of reciprocable diaphragms mounted in said casing on opposite sides of said shaft and coacting with the casing to form a plenum chamber between the diaphragms, an operating air intake in said duct member on the upstream side of said valve member, said air intake defining an air intake opening oriented to receive the kinetic impact of air flowing in the duct member to pass by said valve member, conduit means connecting said air intake with said plenum chamber, linkage means connecting said diaphragms to said shaft to rotate the latter upon reciprocation of the diaphragms, said casing including means coacting with said respective diaphragms to define therewith exhaust chambers on the sides thereof opposite from said plenum chamber, said casing including means defining valve passages communicating with said respective exhaust chambers, means forming exhaust openings communicating with said respective exhaust chambers through said respective valve passages, said diaphragms including in association therewith means cooperable with said respective valve passages to close either valve passage as an incident to displacement of said diaphragms in said casing to effect a predetermined contraction of the exhaust chamber communicating with the valve passage, control means for opening and closing said exhaust openings alternately, and means providing continuously for bleeding air under pressure from said plenum chamber into said respective exhaust chambers, the effective flow area of said means for bleeding air into each exhaust chamber being substantially smaller than said exhaust opening communicating with the exhaust chamber.

8. A pneumatically actuated valve comprising, in combination, a duct member, an actuator casing adjacent said duct member, a movable valve member in said duct member for opening and closing the latter, operating shaft means connected to said valve member and extending into said casing, an arm connected to said shaft means in said casing and extending radially from the axis of the shaft means, said arm forming a guide thereon extending radially outward from the axis of said shaft means, a swingable guide lever in said casing, means providing pivotal support to said lever at a location thereon radially spaced from the axis of said shaft means, a transmission element articulated with said guide for movement therealong and connected to said guide lever for movement therewith in an arc extending between the pivotal support to said guide lever and the axis of said shaft means, first locking means on said guide lever, second locking means engageable with said first locking means, biasing means connected with said second locking means for normally urging the latter into engagement with said first locking means to hold said guide lever and hence said operating shaft means against angular displacement, a connecting link pivotally supported on said guide lever, means positioned for limiting swinging movement of said connecting link relative to said guide lever to a predetermined angle, unlocking means coacting with said connecting link and with said second locking means for disengaging the latter as an incident to said limited swinging movement of said connecting link relative to said guide lever, a pair of reciprocable diaphragms mounted in said casing and defining therewith a plenum chamber, means connecting said diaphragms with said connecting link to transmit movement of said diaphragms to the latter, means for supplying air under pressure into said plenum chamber, said casing including means coacting with said diaphragms to define two exhaust chambers on the sides of said diaphragms opposite from said plenum chamber, said diaphragms defining orifices of limited size extending therethrough to supply air at limited rates from said plenum chamber into said respective exhaust chambers, means defining exhaust openings connected with said respective exhaust chambers, and control means for opening and closing said exhaust openings alternately.

9. A pneumatically actuated valve comprising, in combination, a duct member, a movable valve member in said duct member for opening and closing the latter, operating shaft means connected to said valve member and extending externally of said duct member, an arm connected to said shaft means protruding from said duct member and extending radially from the axis of the shaft means, said arm forming a guide thereon extending radially outward from the axis of said shaft means, a swingable guide lever, means providing pivotal support to said guide lever at a location thereon radially spaced from the axis of said shaft means, a transmission element articulated with said guide for movement therealong and connected to said guide lever for movement therewith in an arc extending between the pivotal support to said guide lever and the axis of said shaft means, first locking means on said guide lever, second movable locking means biased toward engagement with said first locking means to normally hold said guide lever and hence said valve member against angular displacement, a connecting link pivotally supported on said guide lever, means positioned for limiting swinging movement of said connecting link relative to said guide lever to a predetermined angle, unlocking means coacting with said connecting link and with said second locking means for disengaging the latter from said first locking means as an incident to said limited swinging movement of said connecting link relative to said guide lever, and power actuating means connected to said connecting link for operating the latter to disengage said second locking means and shift said valve member from one position to another.

10. A pneumatically actuated valve comprising, in combination, a duct member, an actuator casing adjacent said duct member, a movable valve member in said duct member for opening and closing the latter, operating shaft means connected to said valve member and extending into said casing, reciprocable diaphragm means mounted in said casing, said casing including means defining with said diaphragm means two exhaust chambers on opposite sides thereof, restricted flow means for supplying air under pressure to said respective exhaust chambers, means defining exhaust openings connected with said respective exhaust chambers, control means for opening and closing said exhaust openings alternately, linkage means interconnecting said diaphragm means with said shaft means to rotate the latter as an incident to displacement of said diaphragm means in said casing, locking means interconnected with said linkage means to normally lock said shaft means against angular displacement, said linkage means including at least two parts movable relative to each other as an incident to the application of force to the linkage by said diaphragm means, and means interconnecting at least one of said last mentioned parts with said said locking means to disengage the latter as an incident to movement of said parts relative to each other upon application of operating force by said diaphragm means.

11. A pneumatically actuated valve comprising, in combination, a duct member, an actuator casing adjacent said duct member, a movable valve member in said duct member for opening and closing the latter, operating shaft means connected to said valve member and extending into said casing, an arm connected to the end of said shaft means in said casing and extending radially from the axis of the shaft means, said arm forming a guide thereon extending radially from the axis of the shaft means, said arm forming a guide thereon extending radially outward from the axis of said shaft means, a swingable guide lever, means pivotally supporting said guide lever in said casing at a location on the lever radially spaced from the axis of said shaft means, a transmission element articulated with said guide for movement therealong and connected to said guide lever for movement therewith in an arc extending between said pivotal lever support and said shaft axis, flexible diaphragm means mounted in said casing, means connecting said diaphragm means to said lever to rotate the latter as an incident to movement of said diaphragm means in said casing, said casing including means defining with said diaphragm means exhaust chambers on opposite sides of the latter, air supply means connected to supply air under pressure at a restricted flow rate continuously to said respective exhaust chambers, means providing a pair of valve passages communicating with said respective exhaust chambers, means defining two exhaust openings communicating with said respective chambers through said respective valve passages, said diaphragm means including means associated therewith and cooperable with said valve passages to close either passage as an incident to displacement of said diaphragm means effecting a predetermined contraction of the exhaust chamber communicating with the passage, and means for opening and closing said exhaust openings alternately.

12. A valve unit comprising, in combination, a movable valve member, a rotary control element connected to operate said valve member, means supporting said control element for rotary valve controlling movement about a predetermined axis, said control element including an actuating guide extending away from said axis thereof and having substantial length, a swingable guide lever, means pivotally supporting said guide lever at a location thereon radially spaced from the axis of said control element, a transmission element connected to said guide lever in radially spaced relation to said pivotal support means therefor and articulating with said actuating guide to rotate said valve control element as an incident to swinging movement of said lever, first locking means on said guide lever, second locking means biased into engagement with the first locking means to normally hold said guide lever and hence said valve member against displacement, a swingable connecting link, means providing a lost motion connection between said connecting link and said guide lever which limits movement of said link relative to said lever, means coacting with said connecting link and with said second locking means for disengaging the latter from said first locking means as an incident to limited movement of said connecting link relative to said guide lever, and reversible power actuating means connected to said link for operating the latter to disengage the second locking means and shift the position of said valve member.

References Cited in the file of this patent

UNITED STATES PATENTS

| | | |
|---|---|---|
| 728,380 | Eggleston | May 19, 1903 |
| 1,849,930 | Ives | Mar. 15, 1932 |
| 2,296,213 | Kretzschmar | Sept. 15, 1942 |
| 2,348,492 | O'Shei | May 9, 1944 |
| 2,402,208 | Read | June 18, 1946 |
| 2,616,449 | Maha | Nov. 4, 1952 |
| 2,655,942 | Dougherty | Oct. 20, 1953 |
| 2,729,232 | Hughes | Jan. 3, 1956 |
| 2,753,147 | Welge | July 3, 1956 |

FOREIGN PATENTS

| | | |
|---|---|---|
| 874,232 | Germany | Apr. 20, 1953 |